US008918282B1

(12) United States Patent
Stenneth

(10) Patent No.: US 8,918,282 B1
(45) Date of Patent: Dec. 23, 2014

(54) TURN RESTRICTION DETERMINATION

(71) Applicant: HERE Global B.V., Veldhoven (NL)

(72) Inventor: Leon Stenneth, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/015,185

(22) Filed: Aug. 30, 2013

(51) Int. Cl.
*G01C 21/00* (2006.01)
*G08G 1/0967* (2006.01)

(52) U.S. Cl.
CPC .................................... *G08G 1/0967* (2013.01)
USPC ............ 701/450; 701/117; 701/409; 701/411

(58) Field of Classification Search
USPC .................................. 701/411, 450, 409, 117
See application file for complete search history.

(56) References Cited

U.S. PATENT DOCUMENTS 5,862,509 A 1/1999 Desai et al.
6,278,939 B1 * 8/2001 Robare et al. ................. 701/431
6,292,745 B1 * 9/2001 Robare et al. ................. 701/409
7,124,199 B2 10/2006 Miller et al.
2009/0138497 A1 5/2009 Zavoli et al.
2010/0010733 A1 * 1/2010 Krumm ......................... 701/201
2012/0038490 A1 * 2/2012 Verfuerth ....................... 340/910
2012/0316780 A1 * 12/2012 Huth ............................. 701/450
2013/0006517 A1 * 1/2013 Ofek et al. .................... 701/411
2013/0060465 A1 * 3/2013 Smartt .......................... 701/461

FOREIGN PATENT DOCUMENTS

CA 2302462 7/1998
CA 2704638 5/2009
CN 101842823 9/2010
JP 2002512683 4/2002
JP 2011503639 1/2011
RU 2010123016 12/2011
WO WO9828701 7/1998
WO WO2009059766 5/2009

* cited by examiner

*Primary Examiner* — Hussein A. Elchanti
(74) *Attorney, Agent, or Firm* — Lempia Summerfield Katz LLC

(57) ABSTRACT

Turn restrictions are identified and associated with an intersection. Geographic data is collected over a period of time from mobile devices located near the intersection. A geometric pattern is derived from the geographic data. A comparison between the geometric pattern and predefined geometric patterns associated with turn restrictions is performed. A turn restriction for the intersection is determined based on the comparison.

20 Claims, 6 Drawing Sheets

TURN RESTRICTION DETERMINATION

FIELD

The following disclosure relates to turn restriction determinations, and more specifically to determining turn restrictions using mobile device position data.

BACKGROUND

Intersections in road systems exist and are modeled in navigational and geographic databases. Intersections have different geometries and intersection characteristics. For example, some intersections are four way orthogonal intersections, in which two bi-directional roadways intersect at a right angle. In a four way orthogonal intersection vehicles or travelers may have the ability to take a right turn, a left turn, or a U-turn while traveling in any of the four total directions of the two roadways provide. In some intersections however, one or more of the turn possibilities are restricted and not allowed. Turn restrictions are in place for a multitude of reasons, many of which have little to do with the geographic characteristics of an intersection. For example, a turn restriction may exist because a planning or policy commission for a community has determined that an excessive amount of accidents are caused at an intersection. In such a case, a singular, or all, left turns may be restricted. Turn restrictions may also be in place because of traffic volumes at different times of day. For example, a left turn restriction may be put into place for the hours of 4:00 PM to 7:00 PM because there is a significant increase in traffic during this time of day, and a turn restriction is needed to allow for proper traffic flow.

The policy basis, or non-geographic reasoning, for putting into place turn restrictions makes it difficult to determine turn restrictions without manually determining the existence of a turn restriction at each intersection of a geographic or navigational database. Manually determining the existence of turn restrictions generally involves sending a person to an intersection to determine if a turn restriction exists, which is a resource intensive and expensive task.

SUMMARY

In an embodiment, geographic data collected over a period of time from mobile devices located near an intersection is received. A geometric pattern is derived from the geographic data. A comparison is performed between the geometric pattern and predefined geometric patterns associated with turn restrictions. A turn restriction is determined based on the comparison and associated with the intersection.

In an embodiment, a memory is configured to store geographic data collected over a period of time from mobile devices located near an intersection. The memory is also configured to store a collection of predefined geometric patterns associated with specific turn restrictions. Also, a controller is configured to derive a geometric pattern from the geographic data. The controller is further configured to compare the geometric pattern to the predefined geometric patterns to determine a similarity and determine a turn restriction to associate with the intersection based on the similarity.

In an embodiment, a non-transitory computer readable medium including instructions that when executed on a computer are operable to receive geographic data collected over a period of time from mobile devices located near an intersection. The instructions are also operable to derive a geometric pattern from the geographic data. The instructions are also operable to compare the geometric pattern to predefined geometric patterns associated with turn restrictions. The instructions are also operable to determine a turn restriction to associate with the intersection based on the geometric pattern and predefined geometric patterns.

BRIEF DESCRIPTION OF THE DRAWINGS

Exemplary embodiments of the present invention are described herein with reference to the following drawings.

DETAILED DESCRIPTION

Many travelers of road systems use the navigation capability of mobile units or devices to aid in the traversal of the road systems. This phenomenon provides a significant amount of mobile device position tracking data associated with the travelers. As travelers typically obey road system limitations, such as turn restrictions, the data associated with these travelers may be indicative of turn restrictions.

Mobile device data may be collected over a period of time. The collected mobile device data may be located geographically proximate to a road system intersection. This data collection may provide a significant amount of mobile device location information. An analysis may be performed on the mobile device data. For example, the analysis may be performed using clustering techniques. Anomalous data, or data that is determined to not be indicative of the existence of a turn restriction, may be removed or suppressed during the analysis. For example, clusters of insufficient data density may be removed from the analysis. This anomalous data may be the result of inaccurate position data, or an atypical traveler that did not adhere to the turn restriction. A geometric pattern, may be determined from the analysis of the mobile device data. For example, the centroids of clusters may be determined and connected with lines to approximate a shape. The geometric pattern is then compared to geometric patterns that have been predefined for potential turn restrictions of different intersection types. For example, the geometric pattern may be subjected to a curve fitting technique to determine if the geometric pattern has a sufficient similarity to any of the predefined turn restrictions. When the comparison yields a match to a predefined turn restriction, the turn restriction is associated with the intersection in a geographic or navigational database.

Figure 1:
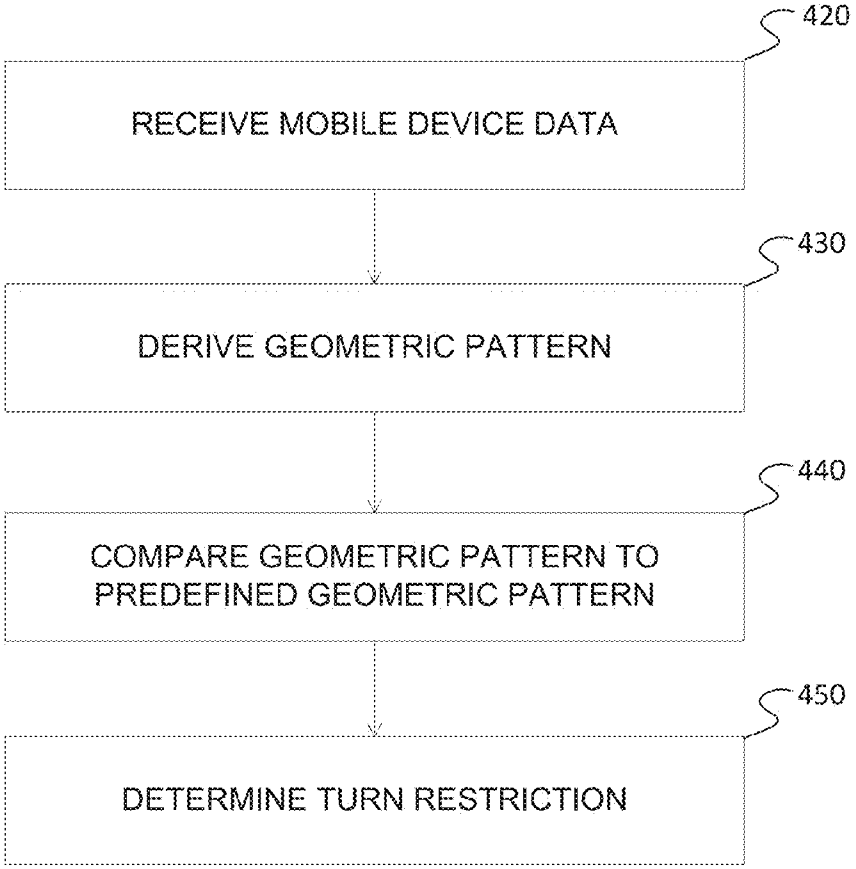
FIG. 1 illustrates an example flowchart for determining turn restrictions.

FIG. 1 illustrates an example flowchart for determining turn restrictions. As presented in the following sections, the steps may be performed using any combination of the components indicated in FIG. 4, FIG. 5, or FIG. 6. For example the term controller may refer to either controller 200 of or processor 300 and the following acts may be performed by mobile device 122, server 125, or a combination thereof. Additional, different, or fewer acts may be provided. The acts are performed in the order shown or other orders. The acts may also be repeated.

In act 420 geographic data collected over a period of time from mobile devices located near an intersection is received. The period of time may be a number of minutes, hours, days, or any period of time sufficient to provide enough mobile device data to be analyzed. In an embodiment, the mobile device data is position data representing the position of a mobile device at a particular time. The time may be included in the mobile device data. The mobile device data may be associated, or presumed to be associated, with vehicles traveling a road system. In an embodiment, mobile device data associated with vehicles is distinguished from mobile device data associated with pedestrians. This distinction may be performed based on a type of mobile device that the data originated from, the type of data that is received, or an identifier included in the mobile device data that indicates the association of the data.

In an embodiment, the geographic data may include data taken over a period of days and grouped into time periods for further analysis.

In act 430 a geometric pattern from the geographic data. The geometric pattern may be determined using any technique or method capable of creating geometric patterns from collected geographic data. In an embodiment, clustering techniques are used to determine geometric patterns from the geographic data.

Derived geometric patterns may vary over time, and the variance may be periodic. The time variation of derived geometric patterns may be indicative of a periodic turn restriction. For example, a turn restriction may only be in effect during a time period such as 4:00 PM to 7:00 PM during weekdays. The derived geometric patterns of data taken from 4:00 PM to 7:00 PM during weekdays may differ from data taken at other times. In an embodiment, temporal clustering techniques are used to determine geometric patterns at different time ranges. The temporal clustering techniques may take advantage of a time associated with particular points of the geographic data to form clusters based on position and time data.

The geographic data may also include outlying or anomalous data that is not indicative of the existence of a turn restriction. For example, some of the geographic data may be inaccurate, and thus not provide accurate position data. Anomalous data also may be indicative of a traveler on a road system that did not adhere to an existing turn restriction. This anomalous data may be removed from an analysis to provide results more indicative of actual intersection characteristics. This data tends to be less frequent than data more indicative of intersection characteristics. In an embodiment, clusters may be determined from the geographic data. A number of data points, or density, of each cluster is determined and clusters of insufficient density may be removed or suppressed from an analysis. In an embodiment, a mean number of data points, or a mean density, for each cluster may be determined. Clusters having a density significantly less than the mean density may be removed. In an embodiment, clusters having a density that does not come within a certain threshold of the median density may be removed. In another embodiment, a predetermined minimum density for a cluster may be used to qualify clusters of geographic data for an analysis. Additionally, if an insufficient number of clusters are determined, the geographic data may be considered inadequate for a geometric pattern determination.

In an embodiment involving clustering techniques, centroids of clusters may be determined, and connected with lines. The resulting collection of lines may be considered the geometric pattern. Centroids of clusters may be determined using any technique.

In act 440 the geometric pattern is compared to predefined geometric patterns associated with turn restrictions. Any technique capable of comparing the geometric patterns to find similarities may be used. For example, geometric pattern matching or curve fitting techniques are used to compare the geometric patterns.

The predefined geometric patterns may be any type of pattern indicative of a turn restriction. The predefined geometric patterns may be automatically determined from mobile data or manually determined. The predefined geometric patterns may be associated with particular types of intersections. For example, a four way orthogonal intersection and a Y-type (e.g., three way intersection) intersection may have different geometric patterns associated, that each represent a different type of turn restriction that may exist for that particular type of intersection.

Predefined geometric patterns may be indicative of a turn restriction for an intersection that is direction of travel dependent. For example, a four way orthogonal intersection may involve a no left turn restriction for travelers traveling from West to East, but there may be no turn restriction in place for travelers traveling from East to West. In an embodiment, predefined geometric patterns are provided for direction of travel dependent turn restrictions.

In act 450 a turn restriction to associate with the intersection is determined based on the geometric pattern and predefined geometric patterns. The turn restriction may be determined based on a determined similarity between the geometric pattern and the predefined geometric patterns. The similarity may be a quantitative similarity score, and the turn restriction may be the turn restriction associated with a predefined geometric pattern determined to have the highest similarity score with the geometric pattern.

A determined turn restriction may be any type of turn restriction. For example, the turn restriction may be a no left turn restriction, a no right turn restriction, or a no U-turn restriction. A U-turn is a turn in which a vehicle is oriented in a first direction before the turn and in a substantially opposite direction after the turn.

In an embodiment, the turn restrictions are associated with visual indications of the turn restrictions. For example, it may be determined that a no U-turn turn restriction is to be associated with an intersection. An image of a typical road sign indicating no U-turn may be associated with the intersection. Alternatively, the words "No U-turn" may also be associated as a symbol. A navigation system may then be functional to display the symbol as the intersection is approached.

Figure 2:
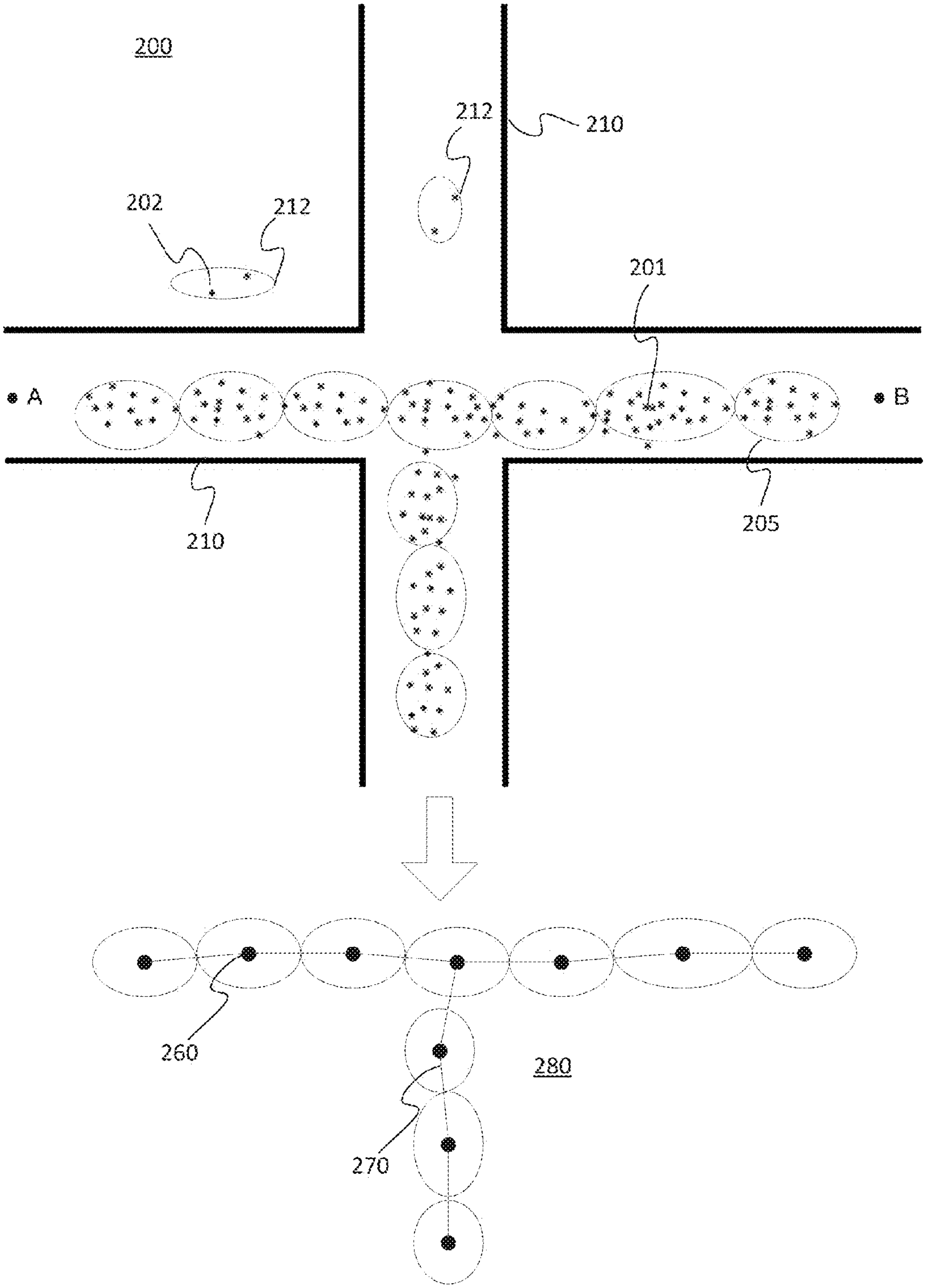
FIG. 2 illustrates an exemplary geometric pattern derivation.

FIG. 2 illustrates an exemplary geometric pattern derivation. An intersection 200 includes two roadways 210 to form an orthogonal four way intersection. Geographic data 201 has been taken from a geographic area proximate to the intersection 200 for a period of time. The geographic data includes anomalous data 202, not indicative of a turn restriction.

Data clustering may be applied to the geographic data 201 to form clusters 205. The clusters 205 may include low data density clusters 212. Low data density clusters 212 may include anomalous data 202. Anomalous data may include data that is not indicative of existing characteristics of an intersection. For example, data may not accurately show the location of the mobile device. The data may also be from a mobile device of a traveler that is not adhering to constraints placed on an intersection. For example, the data may be from a mobile unit of a traveler that turned left, when a left turn restriction was in place. This type of activity and inaccurate readings will tend to be a smaller percentage of the overall data, and not representative of the data set in general. These low data density, or anomalous data, clusters 212 may be removed from further analysis. In an embodiment, the data density of a cluster may be compared to a data density threshold. A cluster may be determined to be a low density data cluster 212 when the data density is below the data density threshold. In an embodiment, a data density threshold may be based on the average data density of the clusters 205 formed from the geographic data 201. For example, a data density threshold may be determined statistically to be a value two standard deviation below a determined statistical average for the data density of the clusters 205. In another example, the data density threshold may be a predetermined value.

Data cluster determination may be manual or automatic. An automatic cluster determination may be performed by any known, or yet to be determined, cluster determination technique. Data cluster determination may be performed by assigning a set of data into subsets, or clusters, such that the data within the same cluster is similar according to some characteristic. In the case of turn restriction determination, an embodiment can designate that geographic proximity to other mobile data points is a shared characteristic of a subset or cluster. In this way geographic areas around intersections may have clusters 205 of geographic data. Multiple data clusters may also be determined for a geographic area, and data clusters 205 may be determined as a function of subclusters. Techniques and models such as connectivity models, K-means models, centroid models, distribution models, density models, subspace models, group models, or graph-based models may be used for cluster determination.

The temporal properties of the geographic data 201 may also be clustered to determine time period based turn restrictions. For example, multiple data clusters representing the same geographic area, but separated temporally, may be used for cluster determination, and cluster characteristic determination. The number of clusters may be determined apriori and considered as input to a clustering algorithm, or the number of clusters may be determined by a clustering algorithm.

Centers of clusters or centroids 260 may be determined for the data clusters 205. The centroids 260 may be used to determine, or define, a geometric pattern. In an embodiment, the centroids 260 may be connected. For example, the centroids may be connected by lines 270. This collection of lines 270 defines a geometric pattern 280. In another embodiment, the arrangement of the centroids 260 is used to define the geometric pattern, with no connections between the centroids 260. The center of a cluster may be determined by any known, or yet to be determined method, including weighted averages of the individual data points of the determined cluster, or the center data point of a k-means or k-medians cluster. The center of the cluster may also be the geometric center of the cluster. In an embodiment, the center a cluster is determined by taking a weighted average of the latitude and longitude of each reported geographic data point.

Figure 3:
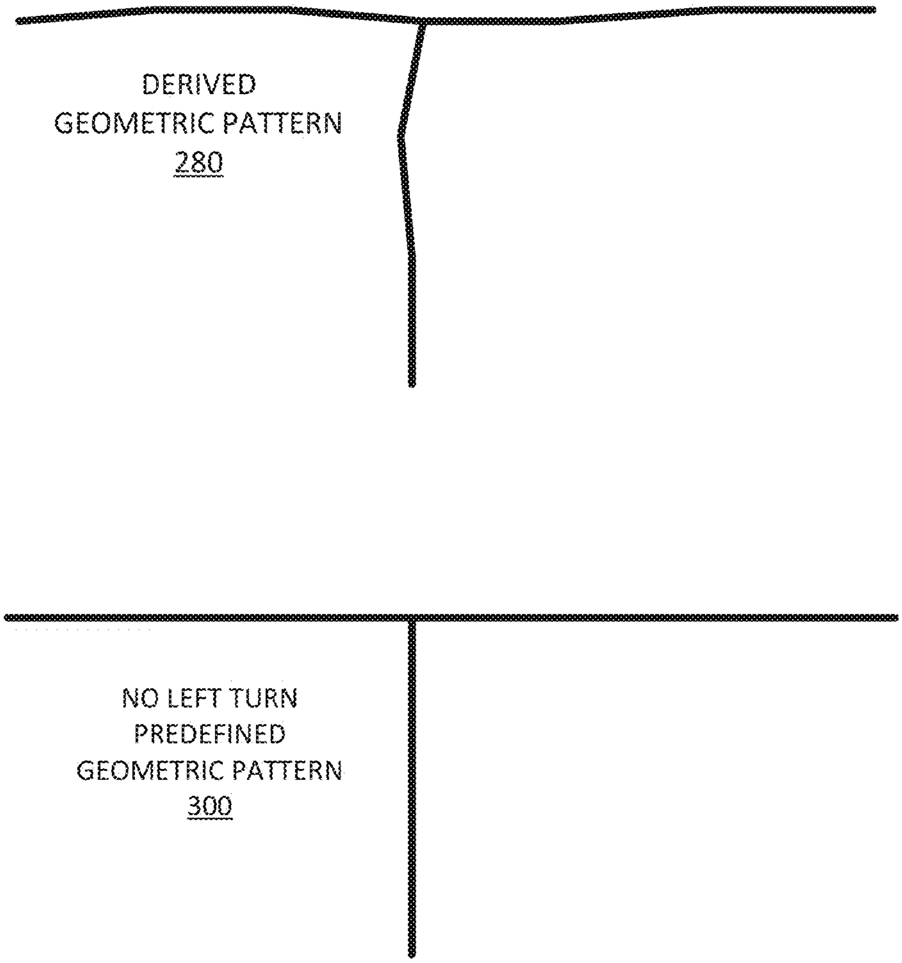
FIG. 3 illustrates an exemplary geometric pattern comparison.

FIG. 3 illustrates an exemplary geometric pattern comparison. A derived geometric pattern 280 may be compared to predefined geometric patterns, such as a no left turn predefined pattern 300 for a four way orthogonal intersection. It may be determined that the derived geometric pattern 280 is most similar to the no left turn predefined pattern 300. Any type of matching technique may be used. For example, pattern matching, geometric matching, curve fitting, edge based methods, or feature-based methods may be used. In an embodiment, none of the predefined geometric patterns may be determined to have a sufficient similarity to determine a turn restriction for an intersection. In such a situation, the intersection may be considered to have no turn restriction.

Predefined geometric patterns may be determined using any method. In an embodiment, predefined geometric patterns are determined from historic geographic data of intersection types with known turn restrictions. In another embodiment, the predefined geometric patterns are physically drawn or otherwise constructed, and not derived from geographic data.

In an embodiment, a quantitative similarity measure is used, such as curve fitting techniques. In an embodiment, determining a Hausdorff distance is used as the similarity measure. In another embodiment, a Frechet distance between geometric patterns. In mathematics, the Frechet distance is a measure of similarity between curves that takes into account the location and ordering of the points along the curves.

In general terms, the Frechet distance is commonly described using the following metaphorical example. The curves may be scaled to the same scale, and overlaid. A dog can walk a path following one of the curves, in this case the derived geometric pattern 280, and a person walking the dog can walk a path on the other curve, in this case the predefined pattern 300. As the two walk the designated paths, a Frechet distance between two curves may be considered the shortest possible length of a leash connecting the dog and the dog walker for an entire trip through the curves. In other words, a Frechet distance is the largest distance of separation of similar points on two curves.

Practically, a Frechet distance between two geometric patterns 280, 300 may be used to determine a quantitative value of the similarity between the geometric patterns. An embodiment may involve scaling the geometric patterns 280, 300 to establish a common coordinate system for the geometric patterns. A predefined geometric pattern 300 of a group of predefined geometric patterns having the smallest Frechet distance when compared to the geometric pattern 280 derived from geographic data may be considered to have the greatest similarity. Consequently, the predetermined geometric pattern having the greatest similarity may have the turn restriction associated with the predetermined geometric pattern, associated with an intersection. In an embodiment, the Frechet distance may be required to be below a maximum allowed value to determine adequate similarity to determine a turn restriction for an intersection. In an embodiment, if the Frechet distance is above the maximum allowed value for all of the predefined geometric patterns, no turn restriction is determined for an intersection.

Graphical methods may be used as well. In an embodiment, the geometric patterns are presented as images, and graphical methods find regions in the derived geometric pattern that contain information similar to the information in the predetermined geometric pattern. This information may become the set of features that describes the image. Pattern matching and geometric matching algorithms use these sets of features to find matches in inspection images by various techniques such as pixel density analysis.

Turn restrictions may be dependent on a direction of travel. A traveler traveling in the direction from point A to point B, as shown in FIG. 2, may have a left turn restriction at an intersection. A traveler traveling in the direction from point B to point A, however, may have a right turn restriction. In the present example, the same graphic pattern 280 will result, and the distinction may be made in an association in a geographic or navigational database. A left turn restriction will be associated with a traveler traveling in the direction from point A to point B, and a right turn restriction will be associated with a traveler traveling in the direction from point B to point A.

Figure 4:
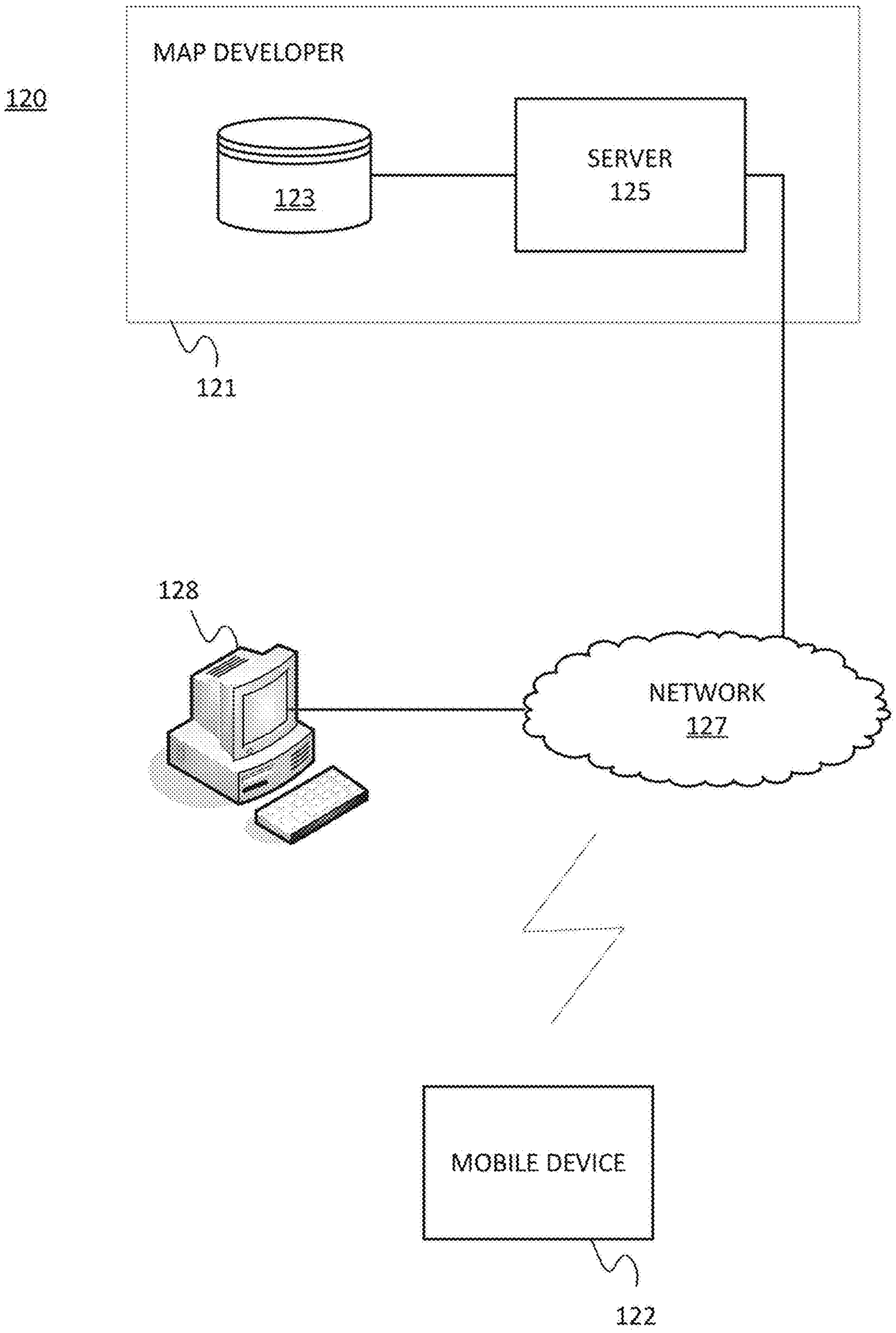
FIG. 4 illustrates an exemplary geographic or navigation system.

FIG. 4 illustrates an exemplary geographic or navigation system 120. The geographic or navigation system 120 includes a map developer system 121, a mobile device 122, and a network 127. Additional, different, or fewer components may be provided. For example, many mobile devices 122 may connect with the network 127.

The developer system 121 includes a server 125 and a database 123. The developer system 121 may include computer systems and networks of a system operator such as NAVTEQ or Nokia Corporation. The geographic database 123 may be partially or completely stored in the mobile device 122.

The developer system 121 and the mobile device 122 are coupled with the network 127. The phrase "coupled with" is defined to mean directly connected to or indirectly connected through one or more intermediate components. Such intermediate components may include hardware and/or software-based components.

The database 123 includes geographic data used for navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structure cartographic data or pedestrian routes. Geographic data may be used to determine structure access characteristics.

The mobile device 122 includes one or more detectors or sensors as a positioning system built or embedded into or within the interior of the mobile device 122. Alternatively, the mobile device 122 uses communications signals for position determination. The mobile device 122 receives location data from the positioning system. The server 125 may receive sensor data configured to describe a position of a mobile device, or a controller of the mobile device 122 may receive the sensor data from the positioning system of the mobile device 122. The mobile device 122 may also include a system for tracking mobile device movement, such as rotation or acceleration. Movement information may also be determined using the positioning system.

The mobile device 122 may communicate location and movement information via the network 127 to the server 125. The server 125 may use the location and movement information received from the mobile device 122 to associate the mobile device 122 with a geographic region described in the geographic database 123. Server 125 may also associate the mobile device 122 with a geographic region manually.

The server 125 may receive location and movement information from multiple mobile devices 122 over the network 127. The location and movement information may be in the form of mobile device data. The server 124 may compare the mobile device data with cartographic data of a structure stored in the database 123. The server 125 may determine a structure access characteristic based on the comparison of the mobile device data with cartographic data of a structure. The structure access characteristic may be a characteristic of the structure that has cartographic data stored in the database 123. The structure may be a building, and the structure access characteristic may be the location of an entrance or exit of the building.

The computing resources for determining an intersection turn restriction may be divided between the server 125 and the mobile device 122. In some embodiments, the server 125 performs a majority of the processing. In other embodiments, the mobile device 122 performs a majority of the processing. In addition, the processing is divided substantially evenly between the server 125 and the mobile device 122.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

Figure 5:
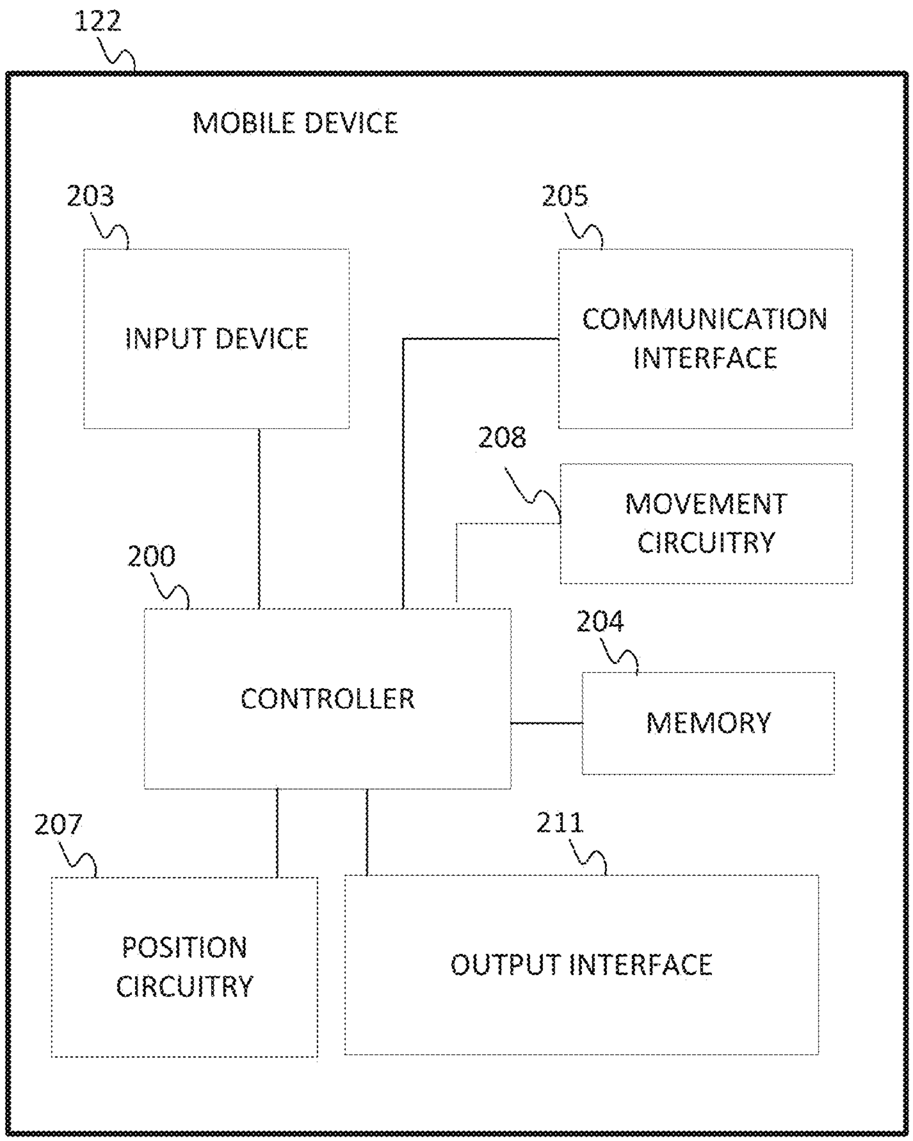
FIG. 5 illustrates an exemplary mobile device of the geographic or navigation system of FIG. 1.

FIG. 5 illustrates an exemplary mobile device of the geographic or navigation system of FIG. 4. The mobile device 122 may be referred to as a navigation device. The mobile device 122 includes a controller 200, a memory 204, an input device 203, a communication interface 205, position circuitry 207, movement circuitry 208, and an output interface 211. The output interface 211 may present visual or non-visual information such as audio information. Additional, different, or fewer components are possible for the mobile device 122. The mobile device 122 is a smart phone, a mobile phone, a personal digital assistant (PDA), a tablet computer, a notebook computer, a personal navigation device (PND), a portable navigation device, and/or any other known or later developed mobile device. In an embodiment, a vehicle may be considered a mobile device, or the mobile device may be integrated into a vehicle. The positioning circuitry 207, which is an example of a positioning system, is configured to determine a geographic position of the mobile device 122. The movement circuitry 208, which is an example a movement tracking system, is configured to determine movement of a mobile device 122. The position circuitry 207 and the movement circuitry 208 may be separate systems, or segments of the same positioning or movement circuitry system.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The movement circuitry 208 may include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device. The movement circuitry 208 may be used alone, or with the positioning circuitry 207 to determine mobile device 122 movement.

Positioning and movement data obtained from a mobile device may be considered geographic data.

The input device 203 may be one or more buttons, keypad, keyboard, mouse, stylist pen, trackball, rocker switch, touch pad, voice recognition circuit, or other device or component for inputting data to the mobile device 122. The input device 203 and the output interface 211 may be combined as a touch screen, which may be capacitive or resistive. The output interface 211 may be a liquid crystal display (LCD) panel, light emitting diode (LED) screen, thin film transistor screen, or another type of display. The output interface 211 may also include audio capabilities, or speakers.

The communication interface 205 is configured to send mobile device movement and position data to a server 125. The movement and position data sent to the server 125 may be used to determine a turn restriction. The communication interface 205 may also be configured to receive data indicative of a determined turn restriction. The position circuitry 207 is configured to determine the current location of the mobile device. The controller 200 may be configured to determine a turn restriction. The controller 200 may also be configured to determine a visual indication to display that represents a turn restriction. The output interface 211 may be configured to present the visual indication of the turn restriction to a user of the mobile device 122. The output interface 211 may also be configured to present directions incorporating the turn restriction.

Figure 6:
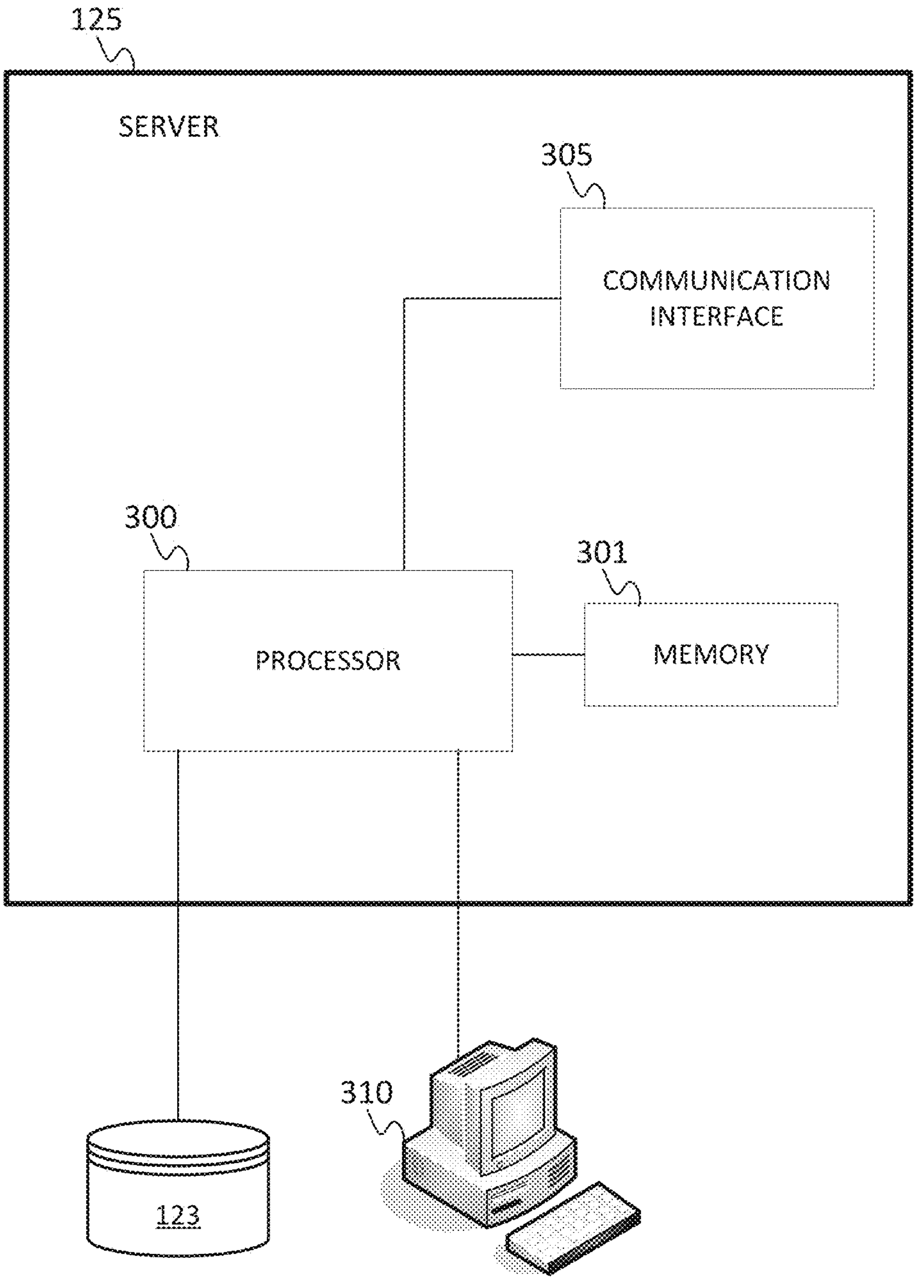
FIG. 6 illustrates an exemplary server of the geographic or navigation system of FIG. 1.

FIG. 6 illustrates an exemplary server of the geographic or navigation system of FIG. 4. The server 125 includes a processor 300, a communication interface 305, and a memory 301. The server 125 may be coupled to a database 123 and a workstation 310. The database 123 may be a geographic database. The workstation 310 may be used as an input device for the server 125. In addition, the communication interface 305 is an input device for the server 125. The communication interface 305 receives data indicative of use inputs made via the mobile device 122.

The communication interface 305 is configured to receive mobile device data representing locations and movements of a plurality of mobile devices 122. The memory 301 may also store a collection of predefined geometric patterns associated with specific turn restrictions. The processor 300 is configured to derive a geometric pattern from the geographic data. The processor 300 is also configured to compare the geometric pattern to the predefined geometric patterns to determine a similarity and determine a turn restriction to associate with the intersection based on the similarity. The predefined geometric patterns may be entered into the memory 301 by a user at the workstation 310, or may be downloaded into the memory via the communication interface 305. The determined turn restriction may be associated with the intersection, and the association stored in the database 123. The determined turn restriction may be direction of travel dependent, and the direction of travel dependency may also be associated with the determined turn restriction. A visual indication of the turn restriction may also be associated with the intersection and the association stored in the database 123. The visual indication of the turn restriction may be direction of travel dependent.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing.

Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:

receiving geographic data collected over a period of time from mobile devices located near an intersection;

deriving, with a processor, a geometric pattern from the geographic data;

performing a comparison, with the processor, of the geometric pattern to predefined geometric patterns associated with turn restrictions; and determining a turn restriction to associate with the intersection based on the comparison.

2. The method of claim 1, wherein the geographic data represents vehicle locations.

3. The method of claim 1, wherein the turn restriction comprises a left turn restriction, a right turn restriction, or a U-turn restriction.

4. The method of claim 1, wherein deriving the geometric pattern comprises a clustering technique used to group the geographic data into clusters.

5. The method of claim 4, further comprising:

comparing a data density of the clusters to a data density threshold; and removing clusters of insufficient density.

6. The method of claim 4, further comprising:

determining centroids of the clusters; and determining the geometric pattern using the centroids of clusters.

7. The method of claim 1, wherein the turn restriction comprises a time of day that the turn restriction is in place.

8. The method of claim 7, wherein the time of day that the turn restriction is in place is determined using a temporal clustering technique to form clusters based on a time associated with the geographic data to determine different geometric patterns for different times of day.

9. The method of claim 1, wherein performing the comparison comprises:

applying a curve fitting technique to the geometric pattern, or calculating a Frechet distance between the geometric pattern and the predetermined geometric pattern.

10. An apparatus comprising:

a memory configured to store geographic data collected over a period of time from mobile devices located near an intersection and to store a collection of predefined geometric patterns associated with specific turn restrictions; and a controller configured to derive a geometric pattern from the geographic data, compare the geometric pattern to the predefined geometric patterns to determine a similarity, and determine a turn restriction to associate with the intersection based on the similarity.

11. The apparatus of claim 10, wherein the geographic data represents the positions of vehicles at particular times.

12. The apparatus of claim 10, wherein the turn restriction comprises a left turn restriction, a right turn restriction, or a U-turn restriction.

13. The apparatus of claim 10, wherein the controller is configured to use a clustering technique to derive a geometric pattern.

14. The apparatus of claim 13, wherein the controller is configured to remove clusters having a data density below a threshold to derive the geometric pattern.

15. The apparatus of claim 13, wherein the controller is further configured to connect centroids of the clusters to derive the geometric pattern.

16. The apparatus of claim 10, wherein the turn restriction comprises a time of day the turn restriction is in effect.

17. The apparatus of claim 16, wherein the time of day the turn restriction is in place is determined using a temporal clustering technique to form clusters based on a time associated with the geographic data to determine different geometric patterns for different times of day.

18. The apparatus d of claim 10, wherein the similarity is determined using a curve fitting technique or a Fréchet distance calculation.

19. A non-transitory computer readable medium including instructions that when executed on a computer are operable to:

receive geographic data collected over a period of time from mobile devices located near an intersection;

derive a geometric pattern from the geographic data;

compare the geometric pattern to predefined geometric patterns associated with turn restrictions; and determine a turn restriction to associate with the intersection based on the geometric pattern and predefined geometric patterns.

20. The medium of claim 19, wherein the instructions are further operable to associate a visual indication of the turn restriction with the intersection in a geographic database.

* * * * *